Sept. 3, 1946. L. A. CLARKE 2,407,137
ALKYLATION OF HYDROCARBONS
Filed May 12, 1944 2 Sheets-Sheet 1

INVENTOR
LOUIS A. CLARKE.
BY
ATTORNEY

Sept. 3, 1946.    L. A. CLARKE    2,407,137
ALKYLATION OF HYDROCARBONS
Filed May 12, 1944    2 Sheets-Sheet 2

INVENTOR
LOUIS A. CLARKE.
BY
ATTORNEY

Patented Sept. 3, 1946

2,407,137

UNITED STATES PATENT OFFICE 2,407,137

ALKYLATION OF HYDROCARBONS

Louis A. Clarke, Fishkill, N. Y., assignor to The Texas Company, New York, N. Y., a corporation of Delaware Application May 12, 1944, Serial No. 535,261

11 Claims. (Cl. 260—683.4)

This invention relates to alkylation for the production of motor fuel hydrocarbons of high antiknock value, and more particularly to the alkylation of isobutane with ethylene for the production of 2,3 dimethylbutane, or an alkylate containing a high proportion of 2,3 dimethylbutane.

This is a continuation-in-part of my copending application Serial No. 470,043 filed December 24, 1942.

One of the principal objects of the invention is to provide an improved method of carrying out this alkylation reaction to obtain large yields of high quality alkylate with good catalyst life while avoiding emulsion and settling difficulties, eliminating or minimizing corrosion difficulties and effecting economy in power consumption.

Another object of the invention is to provide for the efficient alkylation of a relatively dilute ethylene containing hydrocarbon gas fraction such as a refinery gas containing about 30% more or less of ethylene.

Another object of the invention is to provide a method for the handling of a mixed paraffin feed containing substantial proportions of both isobutane and n-butane, with the alkylation of isobutane with the ethylene and the concomitant isomerization of n-butane to isobutane.

Still another object of the invention is to provide novel and improved apparatus for carrying out this alkylation reaction and accomplishing the above noted advantages, the apparatus being simple in construction and of low initial and maintenance cost.

Other objects and advantages of the invention will be apparent from the following description when taken in conjunction with the accompanying drawings and appended claims.

The novel reactor disclosed herein is generally applicable to the various types of liquid alkylation catalysts. However, for the purpose of alkylating isobutane with ethylene to produce high yields of 2,3 dimethylbutane, I prefer to use as catalyst an aluminum chloride-hydrocarbon complex containing added dispersed aluminum chloride as disclosed and claimed in my copending application Serial No. 515,649 filed December 27, 1943. The most satisfactory complexes have been prepared with kerosene or tertiary butyl chloride as the fluid vehicle for forming the complex with aluminum chloride.

The kerosene complex is preferably made by reacting about eight parts by weight of kerosene with five parts of anhydrous aluminum chloride in the presence of about 3% by weight of HCl in a steel reactor for four hours at 210° F. The tertiary butyl chloride complex is preferably made by slowly adding one part by weight of anhydrous aluminum chloride to 2½ parts by weight of tertiary butyl chloride at room temperature and allowing the mixture to stand until the evolution of HCl has practically ceased. To the clear liquid complex as prepared above, additional aluminum chloride is added to provide the desired highly active catalyst.

Difficulties are frequently encountered with such a catalyst when attempting to employ the heretofore used emulsion recycle type of equipment, due to solidification of the catalyst and clogging of the lines and pumping difficulties. These difficulties are overcome by the method and apparatus of the present invention, in which the catalyst is maintained as a relatively stationary body within the tower under adequate temperature control. Also, the present invention enables a hydrocarbon gas mixture containing as little as 30 volume per cent or less of ethylene with the balance made up of diluent paraffins, to be satisfactorily employed as the olefinic charge stock, and at temperatures and pressures at which the said gas mixture is normally in the gas phase.

In accordance with the present invention, the liquid complex alkylation catalyst is maintained as a relatively stationary body in the continuous phase in a vertical reactor of substantial height, such as a tower, and a mixed feed of isoparaffin hydrocarbon and olefin, with the isoparaffin in substantial molar excess of the olefin, is introduced through a small orifice or a plurality of orifices into the lower portion of the liquid catalyst body. The mixed feed passes through the orifice or orifices in such a manner that the feed stream is dispersed in fine drops in the continuous catalyst phase.

The liquid alkylation catalyst has a higher specific gravity than the mixed paraffin hydrocarbon and olefin employed, whereby the dispersed drops of hydrocarbon mixture rise upwardly through the body of liquid catalyst due to this difference in gravity. While there is some turbulence of the liquid catalyst body adjacent the point or points of introduction of the hydrocarbon mixture, there is insufficient agitation to form an emulsion. By the expression "emulsion" is meant the intimate mixture of subdivided particles of both catalyst and hydrocarbon heretofore produced in alkylation reactions of this character by mechanically driven stirrers, high capacity pumps producing turbulent flow, or agitating jets which produce efficient mixing and movement of the catalyst along with the hydrocarbon through the reaction zone. Such an emulsion resists breaking in the reaction zone or reactor and is passed from the reactor into a relatively quiescent zone of a settler, where sufficient settling time is allowed for separate catalyst and hydrocarbon phases to be formed. In the present case, the hydrocarbon mix passes into the maintained body of catalyst liquid in the form of dispersed drops without emulsification. Even though there may be a localized disturbance of the lower portion of the continuous catalyst phase due to the higher velocity of the hydrocarbon adjacent the locus of introduction, the liquid catalyst remains as a continuous phase. The dispersed drops of hydrocarbon rise upwardly through the tower without corresponding upward movement of the catalyst liquid. The net result is that the hydrocarbon mix passes in dispersed form upwardly through a relatively stationary continuous catalyst phase, and promptly forms a separate and superposed hydrocarbon layer as it reaches the top or upper surface of the catalyst liquid.

As distinguished from the prior practice in this art, wherein highly efficient agitation with the formation of emulsion was considered a prime requisite for the production of high yields of alkylate of good quality, it has now been discovered that such emulsion-forming agitation can be avoided while still obtaining the desired results by utilizing the principles of the present invention. As stated above, the liquid catalyst is relatively unagitated except for such turbulence and liquid flow as results from the introduction of the reactants, and the movement of the dispersed drops of reactants upwardly through the maintained body of catalyst liquid. There is substantially unidirectional flow of the hydrocarbon or reactant phase upwardly through the relatively stationary continuous catalyst phase. Also, the orifice is of such small size, generally having a diameter of about $\frac{1}{32}$ inch to $\frac{1}{2}$ inch, and is so correlated with the through-put, that the hydrocarbon reactants are dispersed in the form of small drops of various sizes not exceeding about $\frac{1}{4}$ inch in diameter, and preferably much smaller so as to have a large surface area to volume ratio. This affords a large area of contact between the outer film of each drop and the surrounding catalyst liquid. This operation has been found to promote the desired alkylation reaction between the paraffin and the olefin present in the dispersed drops as the latter pass upwardly through the substantial height of continuous catalyst phase.

As the drops of mixed alkylate and unreacted hydrocarbon reach the upper surface of the catalyst body, they coalesce to form a superposed hydrocarbon layer. A distinct interface between the liquid catalyst body and the superposed hydrocarbon layer is generally maintained in the upper portion of the tower. A stream of this hydrocarbon layer overflows through a discharge line in accordance with the feed rate to the tower.

It is found that the dispersed hydrocarbon drops may tend to entrap a small amount of the catalyst liquid in this superposed hydrocarbon layer. Since the rate of rise of the dispersed drops of hydrocarbon through the catalyst is relatively slow, a considerable volume of dispersed hydrocarbon is normally present at any one time in the catalyst liquid, so that the interface level in the tower during operation is substantially above the initial level of the catalyst alone. Moreover, accidental or deliberate fluctuations in the throughput may cause the interface level to vary; and increase in throughput may cause the level to reach the point of stream withdrawal. Further, the tower can be satisfactorily operated with the interface level at the stream withdrawal point so that the catalyst continuously overflows along with hydrocarbon. In fact, a progressive movement of the complex catalyst through the tower, which catalyst movement is relatively slow in comparison to the rate of flow of hydrocarbon through the tower, is of advantage in maintaining the activity of the complex catalyst more uniform throughout the height of the continuous catalyst phase. In order to insure that catalyst thus carried over with hydrocarbon does not pass into the neutralizing and fractionating sections of the unit, a separator or trap is provided adjacent the point of stream withdrawal and preferably at about the level thereof. Since such catalyst as is entrapped in the superposed hydrocarbon layer or overflows through the stream withdrawal is not in the form of an emulsion with the hydrocarbon, it immediately, or at least rapidly, drops out in this separator, so that large settling volume with substantial settling time is not required as in the case of an emulsion. However, the trap or separator can be constructed of substantial volume, when hydrocarbon recycle is employed, to function as a reservoir for the circulating hydrocarbon. All or any portion of this trapped-out catalyst is preferably returned to the maintained catalyst body within the tower, together with such make-up catalyst as may be required. In continuous operation, a portion of this catalyst may be intermittently or continuously discharged from the system to recovery, and fresh catalyst introduced to make up for that withdrawn.

The recycle of settled hydrocarbon unmixed with catalyst to the alkylation reaction zone has heretofore been proposed in connection with reactors operating with efficient agitation and the formation of emulsions. However, this requires very extensive settling volume, particularly where the recycle rate is many times the fresh feed rate. Consequently, such hydrocarbon recycle has not proved commercially attractive, and emulsion recycle has been universally employed. While a once-through operation is feasible in the present reactor, it is found that materially improved results can be secured in many cases by recycling hydrocarbon to the reaction zone. Preferably a high recycle ratio of the order of about 10 to 50 volumes or more of hydrocarbon recycle to 1 volume of fresh feed is employed. This materially increases the ratio of paraffin to olefin in the reaction zone and increases the effective time of contact, as is well known. Since the settling is quite rapid or almost instantaneous in the present operation, it is apparent that the difficulties inherent in previous proposals involving recycle of hydrocarbon separated from an emulsion are effectively overcome. The recycled hydrocarbon is preferably first admixed with the fresh feed hydrocarbon, and the mixture introduced through the orifice or orifices into the reaction zone. The trapped-out catalyst is preferably returned directly to the maintained catalyst body.

If desired, the reactor or tower of the present invention may be supplied in the reaction zone with one or more layers of solid contact or filling material to thereby increase the length of the path of flow and the time of contact for each once-through flow of the dispersed drops in the catalyst liquid. The packed tower can be operated with once-through flow or hydrocarbon recycle. Any suitable contact material, which is non-reactive with respect to the catalyst and the reactants and which provides sufficient free space for the proper travel of the drops, may be employed. A very suitable type of material for this purpose consists of small contact pieces, each shaped to simulate a saddle, and known to the trade as "berl saddles." There is some indication that the use of a packing in the tower may enable the use of somewhat larger size drops and obtain as good results as with a higher degree of dispersion (i. e., smaller size drops) in an unpacked tower. Moreover, the combination of a packed tower with a high degree of dispersion can be used. However, very satisfactory results are secured with an unpacked tower operating with either once-through flow or hydrocarbon recycle, preferably the latter.

The tower reactor of the present invention is particularly adapted to mixed phase operation with the ethylene containing fraction introduced in gas phase along with the isobutane in liquid phase, although operation with all reactants in liquid phase can be satisfactorily employed. The fine dispersion of the ethylene containing gas mixed with a substantial molar excess of isobutane in small droplets which rise through a substantial height of the catalyst liquid, particularly in a packed tower, promote the substantially complete removal of the ethylene from the gas in a once-through flow. Unabsorbed gas substantially free from ethylene can then be removed from the top of the tower, and thus separated from the liquid hydrocarbons including excess isobutane and heavier. This enables a hydrocarbon gas fraction of relatively low ethylene content, such as about 30% or less of ethylene by volume, the balance being diluents of the character of ethane, methane and hydrogen, to be satisfactorily employed. In such case, a relatively high ratio of hydrocarbon recycle to fresh feed is preferred, such as a recycle ratio of about 20–50:1, to thereby give a high internal isobutane-ethylene mol ratio and at the same time greatly reduce the inert dilution of the fresh feed.

The charge stocks can be relatively pure isobutane and ethylene from any suitable source, although from the standpoint of economy and availability, it is preferred to employ refinery fractions. For example, the ethylene containing fraction may be a $C_2$ or $C_1$—$C_2$ fraction obtained from the fractionation of refinery cracking gas. A fraction obtained from ethane or ethane-propane cracking under known conditions to produce a $C_2$ cut containing at least about 30% by volume of ethylene constitutes a very satisfactory charge for this purpose. In any case, the olefinic fraction preferably contains a small proportion of propylene which is less than about 10% by weight on the basis of the ethylene, in order to maintain the desired fluidity of the complex catalyst in continuous operation. The isobutane fraction can be the overhead from the deisobutanizer, generally running about 90–95% isobutane with the balance mainly n-butane and a small amount of propane.

However, in accordance with the present invention, a mixed isobutane-n-butane fraction containing up to 60% or more by volume of n-butane can be satisfactorily employed with resultant material reduction in the net consumption of isobutane, even down to substantially zero net consumption of isobutane. Under the conditions of the reaction including a temperature of about 105–150° F., and in the presence of the active aluminum chloride-hydrocarbon complex catalyst and the isobutane-ethylene alkylation reaction, the n-butane is concomitantly isomerized to isobutane to thereby make up a part or all of the isobutane requirements. Consequently, a mixed butane feed, such as obtained from the stabilization of natural gasoline and which may run about 40–60% isobutane and 60–40% n-butane, constitutes a satisfactory paraffin feed stock for this process.

The general conditions of this reaction are those set forth in my copending application, Serial No. 439,299, filed April 17, 1942. Briefly, isobutane in substantial molar excess of the ethylene is reacted in the presence of a large body of aluminum chloride catalyst at a temperature of about 105–150° F. and under pressures of about 150–500 pounds per square inch for liquid phase operation, or sufficient pressure within the range of about 50–275 pounds per square inch to maintain the isobutane in liquid phase for the mixed phase operation, the amount of pressure in both cases increasing as the proportion of light inerts in the ethylene feed increases. A small proportion of hydrogen chloride, less than about 0.1% by weight of the hydrocarbon charge, is used as a promoter. A relatively short residence time, less than about twenty minutes, and a propylene concentration in the feed of less than about ten weight percent on the basis of the ethylene are used. Preferred operating conditions are:

| | |
|---|---|
| Isobutane to ethylene mol ratio | 5:1 to 10:1 |
| Temperature °F | 110–130 |
| Hydrogen chloride concentration in feed | 0.05 weight % |
| Residence time, minutes | 5–10 |
| Propylene concentration in olefin | 10 weight % maximum |
| Pressure | 200–300 lbs./sq. in. gauge for liquid phase and 100–260 lbs./sq. in. for mixed phase |

Under the above conditions it has been found that yields of alkylate of from 80 to 90% of the theoretical based on the ethylene can be obtained, in which the alkylate comprises as much as 80% by volume of 2,3-dimethylbutane.

The invention is more particularly illustrated in the attached drawings which disclose preferred embodiments thereof. In the drawings.

Figure 1:
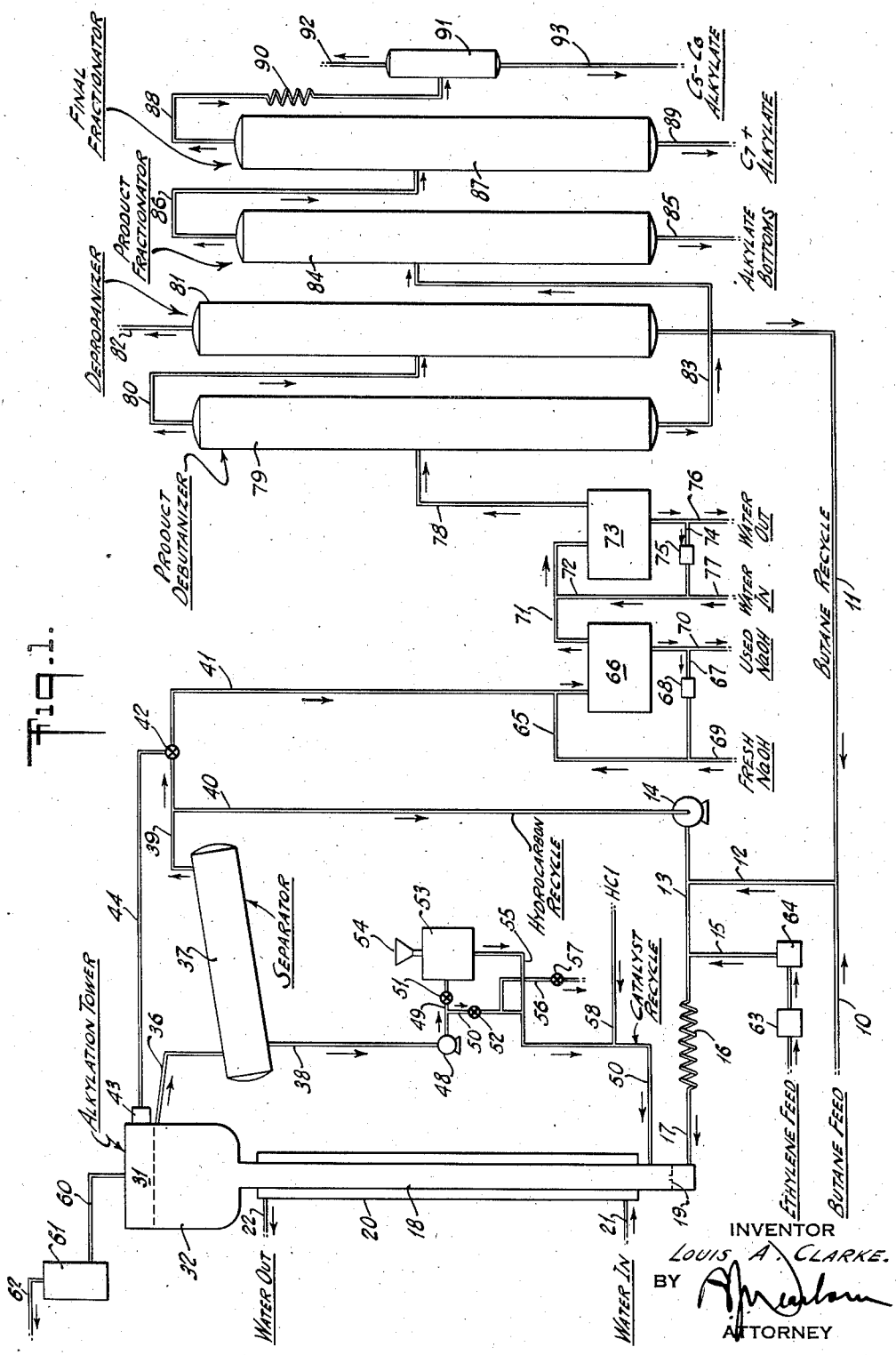
Fig. 1 is a diagrammatic illustration of apparatus suitable for carrying out the method of the present invention.

Referring to the drawings, particularly Fig. 1, the butane fresh feed, which may be mainly isobutane or a mixture containing substantial proportions of both isobutane and normal butane, is introduced by line 10 together with butane recycle from line 11 and passed by line 12 into the hydrocarbon recycle line 13 containing recycle pump 14. The ethylene containing fraction is introduced by line 15 into line 13 on the discharge side of pump 14 beyond the entry of pipe 12 and just in advance of a suitable mixer 16. The latter is designed to produce turbulent flow and agitation to thereby thoroughly commingle the ethylene feed with the liquid hydrocarbon recycle and butane fresh feed and recycle. From mixer 16, the mixture passes by line 17 into the bottom of a tower 18 beneath the orifice plate 19. The tower may be equipped with an external jacket 20 provided with inlet 21 and outlet 22 for the supply of a suitable cooling or heating medium to maintain the desired temperature within the reaction zone. It is to be understood that other conventional means for controlling the temperature in the reaction zone can be used, such as internal evaporative cooling, prechilling of the feed, etc.

Figure 2:
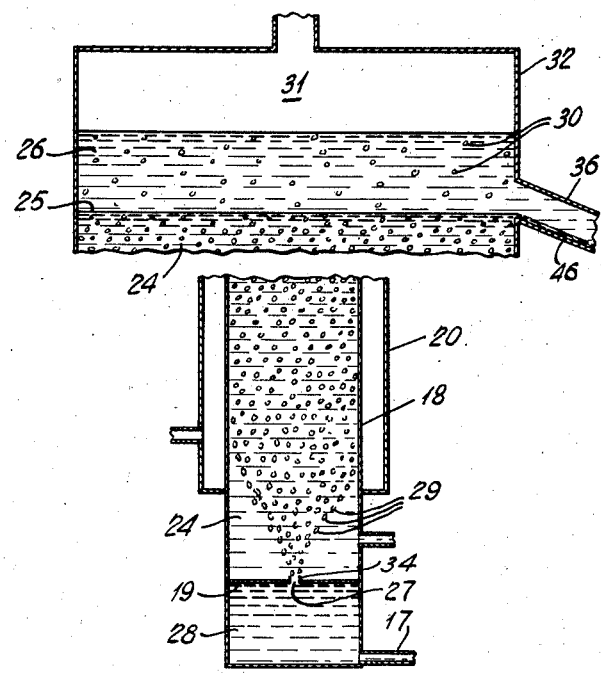
Fig. 2 is a partial vertical sectional view on an enlarged scale of the tower reactor of Fig. 1.

As shown more particularly in Fig. 2, tower 18 is partially filled with a suitable liquid aluminum chloride-hydrocarbon complex catalyst indicated at 24. The amount of this complex liquid is generally such that, during operation with an appreciable volume of hydrocarbon liquid dispersed in the catalyst at any one time, the interface 25 between the relatively stationary body of liquid catalyst and the superposed hydrocarbon layer 26 is positioned adjacent the upper end of the tower.

The orifice plate 19 is provided with an opening or orifice 27 shown as positioned at the vertical axis of the tower, this orifice being of small size of the order previously indicated. The entire tower is maintained under sufficient pressure so that the hydrocarbon mix supplied by line 17 is in a liquid state for liquid phase operation, or so that the isobutane and heavier of the hydrocarbon mix is in liquid state and thoroughly mixed with the dispersed bubbles of ethylene containing gas for the mixed phase operation. This hydrocarbon mixture is sprayed through pipe 17 under sufficient additional pressure to counterbalance the height of the liquid column within the tower and to overcome the pressure drop through orifice 27 to obtain the desired dispersion. The space 28 in the tower beneath the orifice plate 19 remains filled with the hydrocarbon mix, and the catalyst liquid is prevented from flowing down through the orifice into this space and backing up into the inlet pipe 17 by the maintained feed pressure. This causes the hydrocarbon to pass through orifice 27 with the formation of a multitude of small drops indicated at 29, which pass up through the liquid catalyst body due to the difference in gravity between the catalyst and the hydrocarbon. As the drops reach the interface 25, the liquid hydrocarbons of the drops coalesce to form the superposed hydrocarbon layer 26. Remaining unabsorbed and unreacted gaseous hydrocarbon, such as ethane, bubbles up through this hydrocarbon layer 26 as indicated at 30 and accumulates in a gas space 31 at the top of the tower. As shown, the upper end of tower 18 above the water jacket 20 is enlarged as indicated at 32 to provide a chamber of increased cross section and volume to form the gas space 31 and to facilitate the coalescing action and control of the interface level 25.

While the orifice plate 19 can be equipped with a simple opening, it is preferably provided with an upstanding nozzle 34 of a known type adapted to effect a spray dispersion of the hydrocarbon in the form of fine drops. For any given nozzle of this character, at the lower throughput or rate of supply of hydrocarbon, fewer drops of a larger size will issue from the opening or discharge orifice of the nozzle. Theoretically, the throughput rate can be reduced to the point where the drops issue one after the other in relatively slow succession, provided the orifice is sufficiently small so that each individual drop is of a proper small size. As the throughput rate is increased from this given orifice, the drops not only issue faster, but are of smaller size. This also causes the level of the interface 25 to rise, due to the larger number of dispersed drops and the greater volume of hydrocarbon present in the liquid catalyst body at any one time. As the throughput is further increased, the drops become exceedingly fine and the interface level reaches a maximum height. Further increase of the throughput beyond this limit causes an accumulation of hydrocarbon to be formed within the base of the tower surrounding the nozzle, from which globs of the hydrocarbon break off and rise upwardly through the tower. This latter condition results in a drop in the interface level, due to the fact that the degree of dispersion and the quantity of hydrocarbon dispersed in the catalyst at any one time is then reduced. Consequently, this last mentioned condition of operation, which is objectionable and is to be avoided, can be readily detected by the drop in interface level. While satisfactory operation can be secured at the lower throughputs described above, it is generally desirable to operate in the upper portion of the throughput range which produces greater dispersion and a higher interface level approaching the upper limit described above.

Referring again to Fig. 1, the tower 18 is equipped with an overflow or outlet 36 through which the hydrocarbon layer 26 is discharged in a stream to a suitable separator or trap 37. As shown, this is preferably a cylindrical vessel arranged with its longitudinal axis somewhat inclined to the horizontal. Adjacent the lower end of the separator, a bottom discharge line 38 is provided to conduct complex catalyst to the catalyst makeup system and thence back to the tower as later described herein in greater detail. The upper end of separator 37 is provided with an overflow 39 connected with branched lines 40 and 41. Line 40 leads to the recycle pump 14 for the recycle of hydrocarbon back to the reaction tower. Line 41 is provided with a valve 42 which is actuated by a conventional liquid level controller 43 responsive to the level of the superposed hydrocarbon layer 26 within the enlarged portion 32 of the tower. This controller is equipped with the usual fluid line 44 leading to valve 42 for actuation of this valve in accordance with the liquid level as is well understood.

As pointed out above, a major portion of the hydrocarbon is preferably recycled through line 40 and reintroduced together with the fresh feed through line 17 into the tower. A minor proportion of the settled hydrocarbon is withdrawn in accordance with the fresh feed rate, which tends to alter the level of the superposed hydrocarbon layer 26 in the top of the tower, through pipe 41 for further processing to be hereinafter described.

Referring more particularly to Fig. 2, it will be noted that the interface 25 is shown slightly above the level of the lower side of overflow 36, so that a small stream of catalyst liquid indicated at 46 is overflowing along with the hydrocarbon. However, the quantity of catalyst liquid passing off through this overflow is small in proportion to the quantity of hydrocarbon. This operation results in a slow but progressive movement of the catalyst liquid upwardly through the tower at a much lower rate than the movement of the dispersed hydrocarbon drops through this catalyst liquid. This is the preferred condition of operation for continuous running with a substantially constant hydrocarbon feed rate. As previously described, the tower is initially filled with catalyst liquid to a level substantially below the overflow 36. As the hydrocarbon is dispersed into this catalyst liquid, the interface 25 gradually rises in accordance with the volume of hydrocarbon which is dispersed and confined at any one time within the catalyst liquid. At the desired feed rate or throughput, this interface 25 will then reach the lower portion of the opening of overflow 36 as shown.

This catalyst liquid passing off from the tower by overflow 36 immediately drops out in separator 37, forming a lower catalyst layer. This is withdrawn by line 38 and forced by a small catalyst pump 48 to branch lines 49 and 50 controlled by valves 51 and 52 respectively. Line 49 leads to a small tank 53 containing lump aluminum chloride which is supplied thereto through hopper feed 54. Any complex liquid introduced into this tank is activated by dissolving and dispersing the aluminum chloride to raise the heat of hydrolysis of that complex liquid and thus continuously maintain the activity of the catalyst. The activated complex liquid then passes by line 55 to connect with line 50 beyond valve 52. Preferably valves 51 and 52 are set to divide the stream from line 38, a portion passing by line 49 to the catalyst activating tank 53, and another portion by-passing this tank by line 50. Also, a portion of the catalyst liquid from line 50 may be discharged from the system by branch line 56 containing valve 57. In this manner, the catalyst liquid within the tower can be maintained at the desired high activity level over long periods of continuous operation. A small proportion of HCl is introduced continuously or intermittently by line 58 into the catalyst recycle line 50 in order to maintain the desired small amount of HCl promoter within the tower. As shown, line 50 enters tower 18 below water jacket 20 but above orifice plate 19. The described operation thus maintains a slow movement of catalyst liquid through the tower, which is found to prevent the formation of localized zones of decreased catalyst activity within the tower, whereby it is maintained of substantially uniform activity throughout the height thereof; and this operation also provides for the effective activation of the complex catalyst over long periods of continuous operation. At the same time, the difficulties inherent in recycling a large volume of this complex catalyst by the regular emulsion recycle pump are effectively overcome, and only a small catalyst pump of low capacity and which can be readily constructed of non-corrosive material need be provided.

In place of the continuous overflow of a small amount of catalyst liquid 46 through the outlet 36, the operation can be controlled by the hydrocarbon feed rate to give an intermittent overflow of catalyst. Thus, normal operation can be carried out for a period of time at a somewhat reduced hydrocarbon feed rate such that the interface 25 is below the level causing catalyst overflow through outlet 36. Then the hydrocarbon feed rate can be somewhat increased by regulation of pump 14 to increase the hydrocarbon dispersion and consequently raise the interface 25 to the overflow level. After this increased hydrocarbon feed rate has been carried out for a period sufficient to partially or wholly replace the catalyst liquid within the tower and to reactivate the same, the lower feed rate can then be resumed for a further period of time, when the above cycle is repeated. The activity of the complex catalyst is maintained in the manner described in my said application, Serial No. 515,649, so that the heat of hydrolysis per gram of complex liquid is kept above about 315–320 calories. This is readily accomplished in accordance with the present separation by regulating the proportion of recycle catalyst which passes through the activating tank 53.

The present invention enables the ethylene feed from line 15 to be introduced in gas phase thereby obviating the high pressures required for complete liquid phase operation. Due to the effective mixing of the gaseous feed with the substantially larger volume of hydrocarbon recycle from line 40 and the liquefied butane feed from line 12, and further due to the fine dispersion of this feed through orifice 27 and the relatively long flow path of the dispersed hydrocarbon drops through the substantial height of catalyst liquid, the ethylene is substantially completely converted and removed in a once-through flow. Moreover, this is true even where a hydrocarbon gas is employed which has a high proportion of inerts, such as ethane, methane, etc. and a relatively low proportion of ethylene of the order of about 30% or less. Such an olefin feed can be readily and economically obtained, and the substantial expense of purifying and concentrating the ethylene is thereby avoided. The gas accumulating in gas space 31 is therefore mainly ethane and other inert materials, although some isobutane and normal butane may be evaporated where lower pressures are employed. This gas is removed by line 60 through a caustic scrubber 61, and then passed by line 62 to an absorption plant for C4 recovery or other suitable disposal. Preferably the olefinic plant gas feed is subjected to a caustic wash 63 or other suitable treatment for the removal of $H_2S$ and mercaptans, and then may be passed through a suitable drier 64 containing flake calcium chloride or other suitable dehydrating agent to remove water.

The butane feed introduced through line 10 may be substantially pure isobutane or the overhead from a deisobutanizer containing about 90% or more isobutane, the balance being mainly normal butane with a small amount of propane. On the other hand, the present invention enables the use of a butane feed containing large proportions of both isobutane and normal butane. For example, the C4 fraction obtained in the stabilization of natural gasoline, and which may contain about equal proportions of isobutane and normal butane or up to 60% by volume of normal butane and 40% by volume of isobutane constitutes a satisfactory paraffin charge. Intermediate proportions of normal butane in the mix, from about 60% by volume down to 0, can of course be employed. The use of the mixed butane feed containing a substantial proportion of normal butane in excess of the customary equilibrium conversion by isomerization of around 40% normal butane to 60% isobutane, gives a further advantage of decreasing the net isobutane consumption. Under the conditions of the reaction at temperatures of the order of 110–150° F. and in the presence of the active aluminum chloride hydrocarbon complex catalyst and the isobutane-ethylene alkylation reaction, a portion of the normal butane of the feed is concomitantly isomerized to isobutane. Consequently, by recycling the butane fraction of the converted gases removed in the stabilization of the alkylate, the net isobutane consumption in the process may be reduced to 0, or at least to a fraction of the theoretical consumption. This is particularly advantageous for a refinery which is short of isobutane or is utilizing the bulk of the isobutane for $C_4$—$C_5$ alkylation. Thus, the present invention not only enables a dilute ethylene containing fraction to be alkylated with the production of a high grade $C_2$ alkylate or 2,3-dimethylbutane blending stock for the regular $C_4$ and $C_5$ alkylate, but at the same time it produces its own isobutane simultaneously with the alkylate and in a one step operation.

As pointed out above, a major proportion of the hydrocarbon is preferably recycled through line 40 and reintroduced together with the fresh feed through line 17 into the tower. A minor proportion of the hydrocarbon is withdrawn in accordance with the fresh feed rate through pipe 41 and passed with suitable neutralizing agent, such as caustic soda solution, introduced by line 65 into neutralizing tank 66. In this tank, the neutralized hydrocarbon separates as an upper layer from a lower layer of the caustic solution, the major proportion of which may be recycled by line 67, pump 68, and line 65 for treating fresh quantities of hydrocarbons. Fresh caustic is introduced into this circuit by line 69 and a corresponding small proportion of used caustic is discharged by line 70.

A stream of the neutralized hydrocarbon overflows by line 71 and is mixed with water from line 72, the mixture passing into a water washing and surge drum 73. This operation serves to wash out retained caustic and water soluble products of the neutralizing treatment. Stratification takes place in the surge drum 73, the lower water layer being recycled in part by line 74, pump 75 and line 72. The remaining portion of the water layer is discharged by line 76 and fresh makeup water added by line 77.

The neutralized and washed hydrocarbon passes by line 78 into a stabilizer or product debutanizer 79 where unreacted gases including excess normal butane and isobutane together with a small amount of propane are removed overhead by line 80. These gases are passed to a fractionator or depropanizer 81 which removes propane overhead by line 82 to prevent build-up in the system. A bottom stream of mixed isobutane and normal butane then passes by recycle line 11 for mixing with the fresh butane feed from line 10 and introduction into the alkylation tower as previously described.

The fractionating system disclosed is that employed where a mixed isobutane-normal butane paraffin charge is supplied to the alkylation tower for the concomitant alkylation and isomerization reactions previously described. Where a substantially pure isobutane feed containing only a low content of normal butane is employed in the alkylation tower, then the stream from line 80 will be passed to a deisobutanizer tower (not shown) where separation is made between an overhead stream of isobutane containing a small amount of propane and a normal butane bottoms which is discharged to tankage or other use. The overhead then passes to the depropanizer 81 to separate propane from a substantially pure iso-butane recycle which latter is returned by line 11.

As an alternative procedure, the paraffin feed introduced by line 10 can be composed largely or entirely of normal butane in an amount to provide the necessary butane makeup for the process. In this case, the mixed isobutane normal butane bottoms from depropanizer 81 is recycled by line 11 to supply the necessary molar excess of isobutane to olefin in the alkylation tower. The concomitant isomerization reaction then forms additional isobutane from the normal butane feed to make up for the isobutane consumed in the alkylation reaction. The net consumption of isobutane in this procedure is of course 0, and only normal butane fresh feed needs to be supplied to the unit after the latter has reached equilibrium conditions in continuous operation. However, in all procedures it is important that the molar ratio of isobutane to olefin in the alkylation reactor be maintained high, and preferably of the order of about 5:1 to 10:1. Where the normal butane content is about equal to the isobutane content, this will necessarily mean that the overall butane-olefin mol ratio will be about double the isobutane-olefin mol ratio.

The stabilized alkylate is removed from the bottom of product debutanizer 79 by line 83 and passed to a product fractionator 84, which may be operated to take overhead a desired aviation or motor fuel fraction, such as a fraction boiling up to about 350–375° F. A small residue fraction of alkylate bottoms is removed by bottom discharge line 85. The overhead may be passed by line 86 to a final fractionator 87 where a suitable light cut of the alkylate, such as a $C_5$—$C_6$ fraction is removed overhead by line 88. The heavier alkylate fraction, in this case a $C_7$ plus alkylate, is removed by bottom line 89 for use in motor fuel or in other grades of aviation gasoline. The construction shown is that particularly designed to separate a high grade blending stock consisting mainly of 2,3-dimethylbutane for use in the manufacture of an aviation super fuel. This overhead fraction passes through a suitable condenser 90 to an accumulator 91, from which any gases may be vented off by bleed line 92, and the finished $C_5$—$C_6$ alkylate discharged to tankage by line 93.

It will be understood that the $C_2$ alkylate can be separated into other fractions than those described. For example, a 311° F. end point fraction may be separated as the blending stock from heavier alkylate which is passed to motor fuel. On the other hand, the $C_5$—$C_6$ fraction can be further depentanized to separate a total hexane cut as the blending stock; and the hexane cut can in turn be further fractionated to separate a substantially pure 2,3-dimethylbutane. By operating in accordance with this procedure, the total $C_2$ alkylate is composed largely of 2,3-dimethylbutane, generally on the order of about 60–75% by volume, with a small proportion less than about 10% by volume of pentanes, and the balance mainly heptanes and octanes. Under proper operating conditions the total hexane cut is composed very largely of 2,3-dimethylbutane with a smaller proportion of 2,2-dimethylbutane and a very small quantity of less highly branched hexanes. Consequently, the total hexane cut represents an excellent blending stock of especially high octane number of the order of 93–95 C. F. R. M.

The reaction tower 18 illustrated in Fig. 2 is of a relatively smaller capacity type having a single orifice 27. This tower may be conveniently constructed of an interior diameter of about one inch to 12 inches or more, with an orifice selected to give fine dispersion and a lateral distribution to substantially extend throughout the cross-section thereof. The tower may be from about 5 feet to 20 feet or more in height. It will be understood that this is merely representative of satisfactory tower reactors having a single orifice, and that the invention is not limited to towers of these dimensions. However, for a single orifice type, the height should be many times greater than the diameter. Such towers have been successfully operated with heights of catalyst liquid varying from about 30 inches up to about 200 inches or more.

Where a plural number of orifices are used, the diameter of the tower may be greatly increased without necessarily increasing the height. The latter dimension is regulated in accordance with the charge stocks with a view to insuring substantially complete disappearance of the olefin or other alkylating agent as such in a once-through passage. Objectionable side reactions due to prolonged contact of hydrocarbon or unreacted olefin with catalyst in transfer lines and settlers are minimized or avoided. It is to be understood that two or more towers can be used with series flow of hydrocarbon therethrough, where the desired degree of conversion or reaction cannot be accomplished in a single tower of practical height. In this tower reactor, the time of contact for all portions of the reacting hydrocarbons is uniform.

Figure 4:
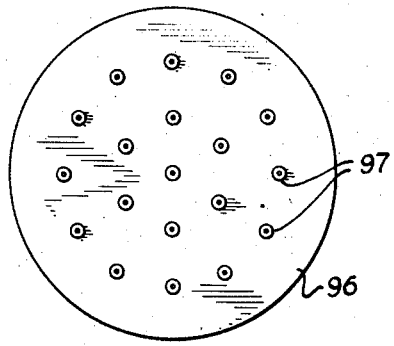
Fig. 4 is a plan view of the orifice plate of Fig. 3.
Figure 3:
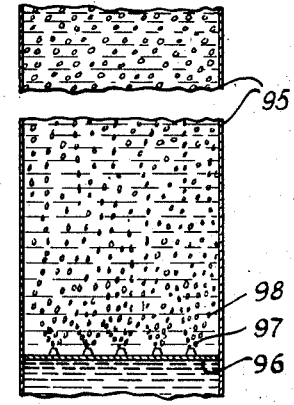
Fig. 3 is a partial view similar to Fig. 2 of a modification.

In Figures 3 and 4, there is shown a modification of the tower reactor particularly designed for larger scale operation. In this form the tower 95 is of relatively larger diameter, such as from two to six feet or more. A bottom orifice plate 96 is provided with a plurality of upstanding nozzles 97 arranged more or less uniformly over the cross section of the plate. Each nozzle is constructed to provide effective dispersion in the manner previously described, the several nozzles being so spaced as to substantially encompass the cross-section of the tower with the drops. This produces a series of sprays of drops 98 into the lower portion of the maintained liquid catalyst body, while avoiding undue agitation, and avoiding undue interference of the drops from one nozzle with those from another.

Figure 5:
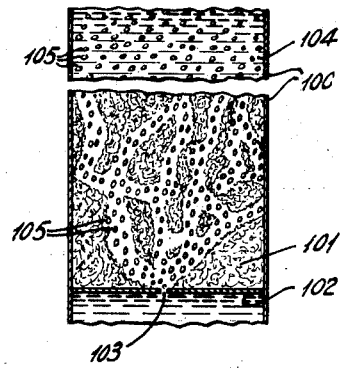
Fig. 5 is a partial view similar to Fig. 2 of a second modification.

Figure 5 discloses another modification wherein the tower 100 is provided with a packing 101 of solid contact material above the orifice plate 102. While a nozzle or plurality of nozzles can be used in this form, it is found that with certain catalyst such as an aluminum chloride-hydrocarbon complex containing suspended aluminum chloride a simple opening or orifice 103 through the orifice plate functions satisfactorily to accomplish the desired dispersion and distribution of the hydrocarbon drops throughout the catalyst liquid, as aided by the contact material. This packing may extend throughout substantially all of the contact zone containing the liquid catalyst, or may extend above the orifice plate 102 throughout only a portion of the height of the tower confining the catalyst, with an upper unpacked section 104. As shown, the hydrocarbon issuing from orifice 103 in the form of the dispersed drops 105 is distributed within a short upward travel throughout the cross-section of the tower. The dispersed drops rise through the catalyst liquid through the free space provided by the packing, the latter impeding the normal velocity of upward travel due to difference in gravity and increasing the length of the path of travel thereof.

While a nozzle, or a plurality of nozzles, adapted to direct the drops upwardly within the tower, has been shown in the drawings, it is to be understood that this arrangement is not essential. Thus, the nozzle may be directed in an inclined or horizontal direction, so long as the hydrocarbon is dispersed into the catalyst liquid in the form of fine drops as described above, which are then free to rise through the catalyst liquid, and so long as undue agitation and emulsification are avoided. Moreover, it is to be understood that other types of dispersing devices can be employed, such as a cone adapted to introduce the hydrocarbon from the periphery thereof and thus disseminate the drops over a larger area of the cross-section of the tower.

*Example I*

The following continuous run was carried out in a 15-foot steel tower of 1″ internal diameter packed with ¼″ "berl saddles" above the orifice plate and having a feed inlet opening of ¼″ diameter. The tower contained a fluid catalyst composed of 1600 cc. of aluminum chloride-kerosene complex prepared as described above, with an added 416 grams of aluminum chloride and having a heat of hydrolysis of 320 calories per gram. The activity of the catalyst was first evaluated by isomerizing normal butane containing 3% HCl, this charge being run through the catalyst at 230° F. for 34 hours at about 400 cc. per hour, giving an average conversion to isobutane of 57% by weight on the basis of the normal butane charged.

The temperature was then lowered to 130° F., and a charge stock prepared by mixing forty pounds of isobutane with 3.5 pounds of ethylene, and which contained 0.1% HCl, was run through the tower at a rate of about 0.5 pound per hour. A once-through operation was used, the hydrocarbon stream being withdrawn, stabilized, fractionated and tested. The operation was continued for approximately sixty hours from the start of running of the mixed isobutane-ethylene charge. The operating conditions and the results of the run were as follows:

| | |
|---|---|
| Isobutane/ethylene mol ratio | 7.3:1 |
| Temperature | 130° F. |
| Pressure, pounds per square inch gauge | 250 |
| Hydrocarbon feed rate | 0.5 lb. per hr. |
| Average yield debutanized alkylate based on olefin | 275 weight % |
| Volume percent of 2,3-dimethylbutane in a typical sample of stabilized alkylate | 70% |

No evidence of catalyst deterioration was observed during this run which was shut down when the charge was exhausted and the catalyst was still highly active.

*Example II*

The following continuous run was carried out in a twenty-foot unpacked tower of two inches internal diameter equipped with a spray nozzle having a dispersion jet of about 1/64 inch diameter. The tower was filled to a height of about 9.5 feet above the spray jet with an activated aluminum chloride-kerosene complex prepared as described above, and composed of 7,700 cc. of previously used complex liquid with an added 2,300 grams of aluminum chloride. Hydrocarbon recycle was employed in the run under mixed phase conditions. In order to evaluate the effect of inert diluent on the ethylene feed, the latter was mixed with nitrogen to obtain a mixed gaseous feed containing about 18% by volume of ethylene. A liquefied isobutane charge containing about 0.1% by weight HCl was mixed with the gaseous ethylene-nitrogen feed and the hydrocarbon recycle for dispersion through the nozzle in the base of the tower. The interface between the top of the catalyst layer and the superposed hydrocarbon layer was maintained below the overflow throughout the run. The run was continued for a period of about 8⅔ hours with overflow of the hydrocarbon stream to the settler, from which the hydrocarbon recycle was withdrawn and a small proportion of the hydrocarbon diverted to a receiver in the manner previously described. This hydrocarbon was stabilized and fractionated. The operating conditions and the results of the run were as follows:

| | |
|---|---|
| Isobutane/ethylene mol ratio | 5:1 |
| Temperature | 107–117° F. |
| Isobutane charge rate | 2 gal./hr. |
| Ethylene charge rate | 0.9 lb./hr. or 0.64 cu. ft./hr. at 260 lbs./sq. in. |
| Nitrogen charge rate | 3.5 cu. ft./hr. at 260 lb./sq. in. |
| Hydrocarbon recycle rate | 7 gal./hr. |
| Weight percent yield of debutanized alkylate based on olefin charged | 230 |
| Percent olefin reacted | less than 90% |
| Volume percent 2,3-dimethylbutane in debutanized alkylate | about 70% |

*Example III*

The following comparative continuous runs were carried out in a twenty-foot tower of two inches internal diameter, using in run A pure isobutane as the liquefied paraffin charge, and in run B a liquefied mixture of equal proportions by weight of isobutane and normal butane. The gaseous olefin feed consisted of about 30% by volume of ethylene and 70% by volume of nitrogen. The tower was equipped with an enlarged head as shown in the drawings and which served as a liquid-gas separator and as a catalyst settler. The tower was packed for 18 feet, or to within 2 feet of the top of the two-inch diameter section, with ¼ inch saddles providing a freespace of about 6,800 cc. in the 18 feet of packed section. The total volume of the enlarged head was 7,420 cc. and the volume of the head from the top of the two-inch diameter tower to the liquid overflow level was 4,170 cc., giving a settling space amounting to 5,410 cc., between the top of the packing and the liquid overflow level. The tower was filled to the top of the packing (about 6,800 cc.) with activated aluminum chloride kerosene complex of the character heretofore described. The tower was equipped with a bottom orifice of ⅛ inch diameter. A once-through operation was employed at a flow rate at which the catalyst interface did not rise as high as the liquid overflow. The butane feed contained about 0.1% by weight of HCl. The butane and the gas feeds were mixed and then dried by passing through a tube packed with CaSO₄ before entering the bottom of the tower. Inert and unreacted gases were removed from the top of the tower above the liquid overflow. The following are the conditions and the results obtained in these runs:

| | Run A | Run B |
|---|---|---|
| Temperature, °F | 110–120 | 110–120 |
| Charge rate, lb./hr.: | | |
| Isobutane | 8.3 | 8.3 |
| N-butane | 0 | 8.3 |
| Ethylene | 0.9 | 0.9 |
| HCl | 0.008 | 0.017 |
| Paraffin/olefin mol ratio | 4.7 | 9.5 |
| Isobutane/olefin mol ratio | 4.7 | 4.8 |
| Ethylene converted weight percent | 88 | 88 |
| Yield of debutanized alkylate: | | |
| Based on olefin charged | 237 | 245 |
| Based on olefin converted | 274 | 280 |
| Isobutane consumption (times theoretical for 2,3-dimethylbutane) by weight | 0.8 | 0 |
| Liquid volume percent butane in effluent gas: | | |
| Isobutane | 75.6 | 47.6 |
| N-butane | | 44.3 |
| Alkylate composition, volume percent: | | |
| Pentane (82–113° F.) | 12 | 14 |
| Hexane (113–149° F.) | 69 | 61 |
| Heptane (149–208° F.) | 7 | 9 |
| Octane (208–248° F.) | 8 | 10 |
| Above octane (248 E. P.) | 4 | 6 |
| Octane rating of depentanized alkylate: | | |
| CFRM clear | 90.8 | 88.8 |
| AFD-1C (4 ml. TEL/gal.) | Iso-octane +0.41 | Iso-octane +0.21 |
| AFD-3C (4 ml. TEL/gal.) | S+4.0 | S+1.6 |
| Weight percent Cl in depentanized alkylate | 0.02 | 0.09 |
| Octane rating of hexane cut: CFRM clear | 93.3 | 91.1 |

It will be noted that the octane of the product with the mixed butane feed is somewhat lower than that of the product obtained with the isobutane feed. The mixed feed product had a somewhat higher chlorine content which may account in part for the lower lead susceptibility as determined in the AFD-1C and AFD-3C tests.

While the invention has been described above in connection with the alkylation of isobutanes with ethylene for the production of 2,3-dimethylbutane, it is to be understood that the method and apparatus are also applicable to the alkylation of isoparaffins with olefins generally in the presence of an activated metallic halide-hydrocarbon complex catalyst. For example, isobutane can be alkylated with propylene, butylenes, amylenes and higher molecular weight mono-olefins, as well as with various olefin polymers, such as diisobutylene, triisobutylene, cross ploymers of isobutylene and normal butylene, mixed and non-selective polymers and the like. Likewise, in place of isobutane, other low-boiling isoparaffins, such as isopentane, may be used. As pointed out above, the invention is particularly advantageous for the alkylation of normally gaseous olefinic fractions which require high pressure for liquefaction at normal atmospheric temperatures, and particularly for refinery cracked fractions containing a substantial proportion of inerts and a relatively low proportion of olefins, since such materials can be handled in the gas phase with very satisfactory results.

While in certain cases, the same liquid catalyst body as originally supplied to the tower may be maintained therein for the entire reaction, thus providing continuous feed of hydrocarbon with batch feed of catalyst, it is to be understood that a portion of the liquid catalyst may be continuously or intermittently withdrawn and replaced with fresh catalyst during continuance of the process. By the expression "relatively stationary" as applied to the liquid catalyst body, it will be apparent that this signifies that the hydrocarbon moves relatively to the catalyst body and at a substantially greater rate of velocity, irrespective of such localized movement or turbulence which may exist within the catalyst liquid, particularly at the lower portion thereof. Moreover, it is to be understood that this expression includes operations in which a small portion of the catalyst liquid may continuously or intermittently overflow to the separator and be returned through the recycle line or in other suitable manner to the liquid catalyst confined within the tower, as well as an operation in which a portion of the catalyst liquid may be continuously or intermittently withdrawn from a lower or intermediate portion of the tower, and fresh catalyst liquid supplied to the maintained catalyst body continuously or intermittently at an upper or intermediate portion of the tower. Thus, there may be relatively slow and progressive movement of the catalyst liquid upwardly or downwardly through the tower, with the dispersed drops of hydrocarbon moving at a substantially higher velocity than the velocity of movement of the catalyst. In such event, the dispersed hydrocarbon drops are still appropriately described as rising upwardly through a "relatively stationary" body of the catalyst liquid, and this expression is used as a matter of convenience throughout the description and claims to include these various operations as above described.

Obviously many modifications and variations of the invention, as hereinbefore set forth, may be made without departing from the spirit and scope thereof, and therefore only such limitations should be imposed as are indicated in the appended claims.

I claim:

1. In the alkylation of a paraffin with an olefin in the presence of an activated aluminum halide-hydrocarbon complex catalyst, the improvement which comprises maintaining a liquid body of the activated aluminum halide-hydrocarbon complex catalyst of substantial height as the continuous phase in an alkylation reaction zone, introducing a mixed feed of paraffin and olefin unmixed with catalyst with at least the paraffin in liquid phase and in substantial molar excess of the olefin, through a dispersing orifice into the liquid catalyst body without sufficient agitation to produce an emulsion therewith, the mixed paraffin and olefin being thereby dispersed in the liquid catalyst body in the form of drops which rise through a substantial height of the continuous catalyst phase due to difference in gravity therebetween, the drops being of small size providing substantial surface contact between the drops and the continuous catalyst phase whereby alkylation of paraffin with the olefin is effected as the principal reaction in the process, the dispersed drops upon reaching the upper surface of the liquid catalyst body coalescing to form a superposed liquid hydrocarbon layer, withdrawing a stream from the superposed hydrocarbon layer, passing said stream to a separator where any entrained catalyst drops out leaving a hydrocarbon phase substantially free from catalyst, recycling a major proportion of the said hydrocarbon phase substantially free from catalyst for reintroduction with the fresh paraffin and olefin feed through the dispersing orifice into the liquid catalyst body, discharging a minor proportion of said hydrocarbon phase and recovering a substantially saturated hydrocarbon alkylate therefrom.

2. The method according to claim 1, wherein the stream withdrawn from the superposed hydrocarbon layer passes by an overflow to a separation zone, the rate of paraffin-olefin feed being regulated to disperse sufficient hydrocarbon within the continuous catalyst phase to cause a rise in the interface between the superposed hydrocarbon layer and the continuous catalyst body to the said overflow level, whereby a relatively smaller amount of the complex catalyst overflows along with said hydrocarbon to said separating zone where the catalyst drops out and is separated, and at least a portion of the separated complex liquid catalyst is activated by the addition of fresh aluminum halide and the activated catalyst recycled directly to the catalyst body within the alkylation reaction zone without passing through said dispersing orifice.

3. The method according to claim 1, wherein the paraffin feed is introduced in liquid phase into said hydrocarbon recycle stream, the olefin is introduced in gas phase into said recycle stream following the introduction of paraffin, and the resulting stream substantially free from catalyst is then subjected to a turbulent mixing action before introduction through said dispersing orifice into the alkylation reaction zone.

4. The method according to claim 1, wherein the mixed paraffin-olefin feed introduced through the said dispersing orifice is initially formed by mixing the paraffin in liquid phase with an olefin containing gas which is diluted with inert non-olefinic gaseous constituents lighter than said paraffin feed, the said unreacted inert gaseous constituents are separated from the superposed hydrocarbon layer containing excess paraffin of said paraffin feed in a gas space formed thereabove, and the said unreacted gas is removed from this gas space in the reaction zone separately from the stream of liquid hydrocarbons containing said excess paraffin removed from the superposed hydrocarbon layer.

5. The method according to claim 1, wherein the said paraffin feed comprises substantial proportions of both isoparaffin and normal paraffin hydrocarbons, and the reaction conditions maintained in the said reaction zone promote both isoparaffin-olefin alkylation and concomitant isomerization of normal paraffin to isoparaffin.

6. The method in the manufacture of an alkylate containing a high proportion of 2,3-dimethylbutane which comprises maintaining a liquid body of activated aluminum chloride-hydrocarbon complex catalyst of substantial height as the continuous phase in a reaction zone, adding a mixed paraffin feed consisting essentially of substantial proportions of both normal butane and isobutane in liquid phase to a dilute ethylene containing gas in a proportion such that the isobutane is in substantial molar excess of the ethylene, introducing the resulting feed substantially free from catalyst through a dispersing orifice into the liquid catalyst body without sufficient agitation to produce an emulsion, the hydrocarbon feed being thereby dispersed in the liquid catalyst body in the form of drops which rise through a substantial height of the continuous catalyst phase due to difference in gravity therebetween, under reaction conditions such that isobutane is alkylated with the ethylene to form alkylate containing a high proportion of 2,3-dimethylbutane and normal butane is concomitantly isomerized to isobutane, the dispersed drops upon reaching the upper surface of the catalyst body coalescing to form a superposed liquid hydrocarbon layer from which unreacted gas lighter than isobutane separates in a gas space provided thereabove, withdrawing a stream from the superposed liquid hydrocarbon layer containing isobutane, stabilizing said withdrawn stream to remove normal butane and lighter from the resulting alkylate, depropanizing the normal butane and lighter constituents to thereby recover a mixture consisting essentially of normal butane and isobutane, and recycling said normal butane-isobutane mixture for redispersion with the fresh feed into the alkylation reaction zone.

7. The method in the alkylation of isobutane with ethylene to form alkylate containing a high proportion of 2,3-dimethylbutane which comprises maintaining a liquid body of activated aluminum chloride-hydrocarbon complex catalyst of substantial height as the continuous phase in a reaction zone, maintaining reaction conditions in said zone conducive to the alkylation of isobutane with ethylene to form alkylate containing a high proportion of 2,3-dimethylbutane, recycling a stream of said alkylate to the alkylation reaction zone, introducing an isobutane feed in liquid phase into said alkylate recycle stream, introducing a dilute ethylene containing feed in gas phase into said alkylate recycle stream beyond the point of introduction of said isobutane feed, subjecting the mixture to turbulent mixing in the substantial absence of catalyst, then introducing the resulting mixture substantially free from catalyst through a dispersing orifice into the liquid catalyst body without sufficient agitation to produce an emulsion, the hydrocarbon being thereby dispersed in the liquid catalyst body in the form of drops which rise through a substantial height of the continuous catalyst phase due to difference in gravity therebetween, the dispersed drops upon reaching the upper surface of the catalyst body coalescing to form a superposed hydrocarbon layer from which the said alkylate recycle stream is withdrawn, unreacted gas lighter than isobutane separating from said superposed liquid hydrocarbon layer into a gas space thereabove, and withdrawing the unreacted gas from said gas space separately from said liquid hydrocarbon containing excess isobutane.

8. The method according to claim 1, wherein the paraffin feed comprises isobutane, the olefin is essentially ethylene, and the alkylation conditions are such that the recovered hydrocarbon alkylate comprises mainly 2,3-dimethylbutane.

9. The method according to claim 1, wherein the paraffin feed consists of about 40-60% by volume of n-butane with the balance essentially isobutane, the olefin is essentially ethylene and the reaction conditions maintained in the said reaction zone promote both isobutane-ethylene alkylation and concomitant isomerization of n-butane to isobutane, whereby the net consumption of isobutane in the process is reduced substantially below theoretical for the alkylate produced.

10. The method in the continuous alkylation of isobutane with an olefin in the presence of a liquid body of activated aluminum halide-hydrocarbon complex catalyst, which comprises continuously mixing a fresh paraffin feed comprising mainly normal butane in liquid phase and a recycle paraffin feed obtained from a source hereinafter recited and consisting essentially of isobutane and normal butane in liquid phase, with an olefin in a proportion to provide a substantial molar excess of isobutane to olefin in said combined feed, dispersing said combined feed unmixed with catalyst and with at least the butanes in liquid phase into a lower portion of said liquid body of aluminum halide hydrocarbon complex confined within a reaction zone, whereby said hydrocarbon feed in the form of dispersed drops rises through a substantial height of the liquid catalyst body due to difference in gravity therebetween and under conditions effective to produce isobutane-olefin alkylation and concomitant isomerization of normal butane to isobutane, the dispersed drops on reaching the upper surface of the liquid catalyst body coalescing to form a superposed liquid hydrocarbon layer, continuously removing a stream of hydrocarbons from said superposed hydrocarbon layer, stabilizing said removed hydrocarbons to separate $C_4$ and lighter and recover a debutanized liquid alkylate, depropanizing the resultant off-gases from said stabilization to thereby recover a mixture consisting essentially of isobutane and normal butane, and returning said mixture as the aforementioned recycle paraffin feed, whereby the net isobutane consumption in the process is not more than a fraction of the theoretical for the alkylate produced.

11. The method according to claim 10, wherein the olefin comprises essentially ethylene, the catalyst is an activated aluminum chloride-hydrocarbon complex, and the reaction conditions are such that the recovered debutanized liquid alkylate comprises mainly 2,3-dimethylbutane.

LOUIS A. CLARKE.